United States Patent [19]
Strasbaugh

[11] 3,848,339
[45] Nov. 19, 1974

[54] CYLOMETER
[76] Inventor: Ray Howard Strasbaugh, 3400 Airport Way, Long Beach, Calif. 90806
[22] Filed: Feb. 9, 1973
[21] Appl. No.: 331,214

[52] U.S. Cl. ............ 33/174 A, 33/169 B, 33/172 R, 33/178 D
[51] Int. Cl. ...................... G01b 5/08, G01b 5/20
[58] Field of Search .......... 33/174 A, 178 R, 178 D, 33/169 B, 169 R, 172 R, 170

[56] References Cited
UNITED STATES PATENTS

| | | | |
|---|---|---|---|
| 1,151,635 | 8/1915 | Webb | 33/174 A |
| 1,416,810 | 5/1922 | Foster | 33/169 B |
| 1,591,261 | 7/1926 | Ames | 33/178 R |
| 1,593,753 | 7/1926 | Darlington | 33/178 R |
| 1,637,408 | 8/1927 | Bugbee | 33/170 |
| 1,656,302 | 1/1928 | Swaney | 33/170 |
| 2,591,453 | 4/1952 | Maag | 33/178 R |
| 2,600,498 | 6/1952 | Hamerly et al. | 33/172 R |

Primary Examiner—Richard E. Aegerter
Assistant Examiner—John W. Shepperd
Attorney, Agent, or Firm—Howard L. Johnson

[57] ABSTRACT

A hand-held device for measuring the curvature of cylindrical or toroidal surfaces such as optical lenses. A longitudinally movable plunger or spindle extends from a rotationally adjustable indicator dial with its work-contact end bisecting a transverse support frame which carries a parallel pair of work-contact buttons spaced apart by the length of a chord of the curved work surface whose midspan is to be contacted by the plunger. The consequent dial read-out is a factor (in mm.) from which the curvature of the arc can be obtained, as by reference to tabulated data. The support frame is detachable from the indicator unit and a progressive series of such frames having buttons spaced apart by different chord lengths are provided for measuring both convex and concave workpieces of different curvatures. The pair of work-contact buttons are flat-ended cylinders which make point contact of an edge of the cylinder with an arcuate workpiece; when worn, such contact points can be shifted by rotating the button in the frame and thus maintain extreme precision of the instrument.

7 Claims, 5 Drawing Figures

PATENTED NOV 19 1974 3,848,339
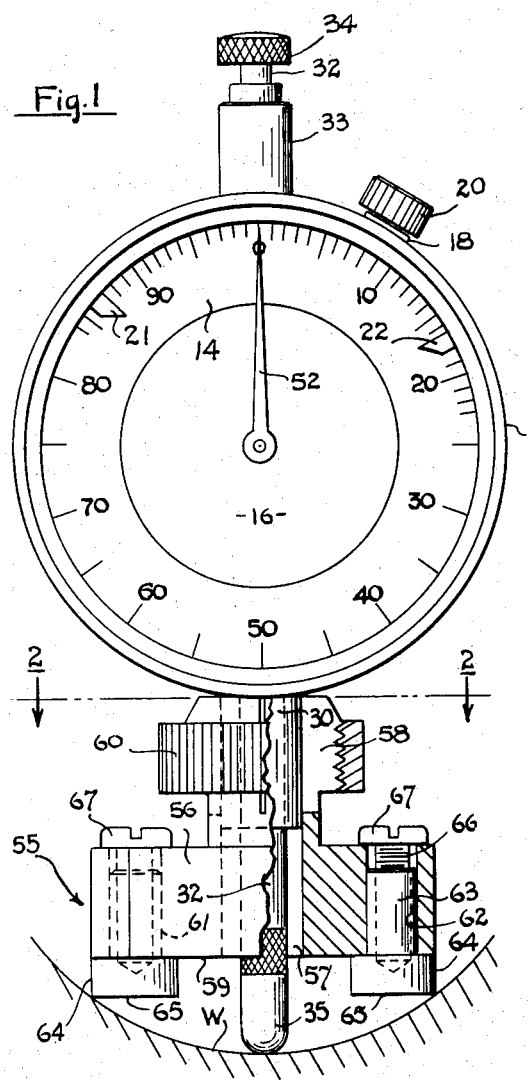
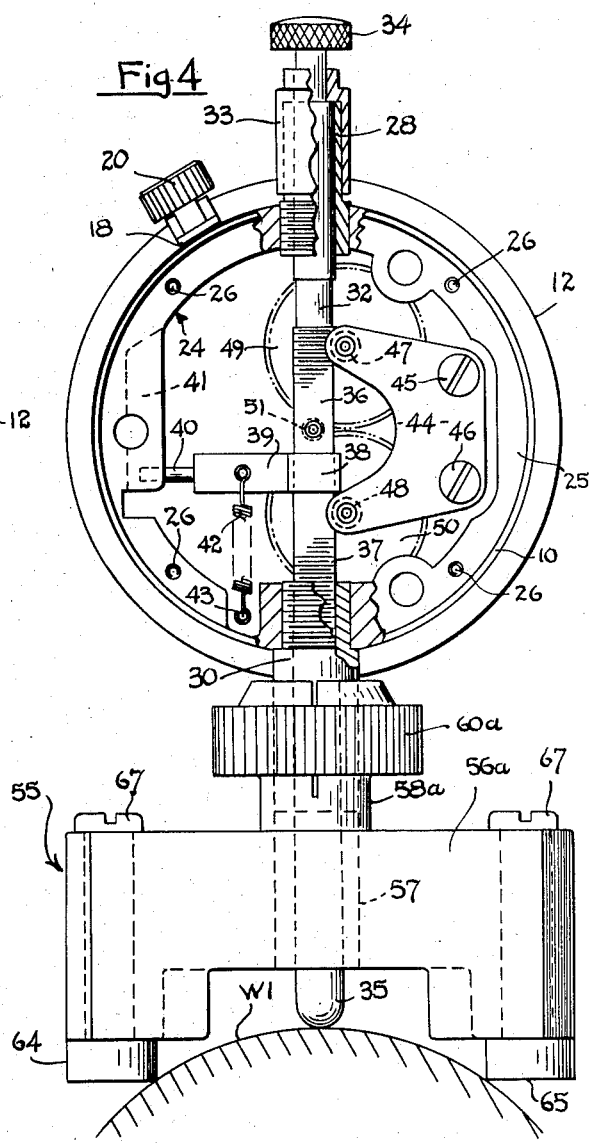
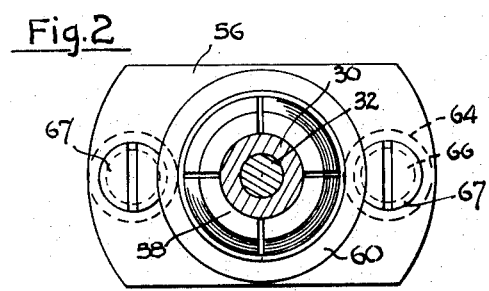
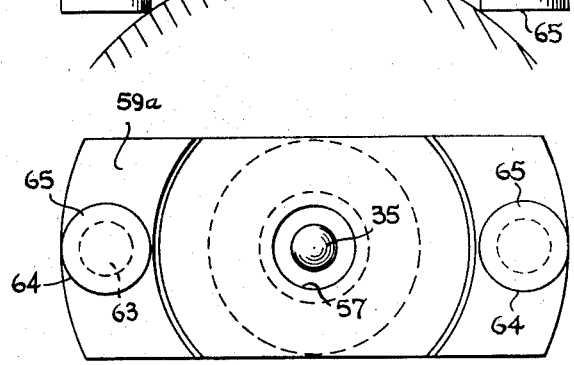
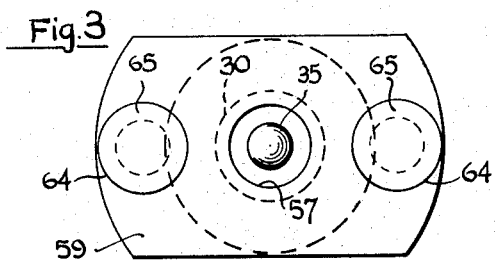
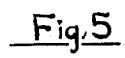

CYLOMETER

BACKGROUND OF THE INVENTION

This invention relates to a hand-size tactile device for measuring cylindrical curvatures of objects such as optical lenses. It is frequently desired to determine the radius of curvature of suck workpieces, both for the purpose of checking new lenses for conformity or accuracy, as well as to ascertain the curvature of old or unknown examples for purposes of comparison or reproduction. This is frequently done by matching a template against the workpiece. However this requires the availability of a series of such templates. Usually several must be compared with a workpiece of unknown curvature and the result still does not serve to identify the example which has a curvature intermediate that of a pair of templates. Also, toroidal lenses have a different curvature respectively for the front and rear faces, and measurement of these requires different templates.

BRIEF STATEMENT OF THE INVENTION

The invention provides a handable, precise arc-measuring instrument embodying a retractable plunger or spindle which bisects a transverse frame which carries a pair of work-contact buttons separated by a known span corresponding to the chord of the arc which is bisected by the plunger. This perpendicular distance at which the plunger comes to rest above or below the chordal plane (depending upon whether the arc is convex or concave) is a parameter of the arcuate curvature and is discernable on an indicator dial which is actuated by the plunger. The dual-button-carrying frame is readily detachable from the plunger-indicator unit, for interchangeable coupling thereto of frames having different chordal span and also those differing by being positioned for measuring convex or concave curvatures respectively. In addition, the pair of flat-faced work-contact buttons which make point-contact with a workpiece, are mounted for rotational adjustment so as to permit change of their positional setting in the frame and thus maintain high precision.

BRIEF DESCRIPTION OF THE DRAWINGS

The invention is embodied in a specific instrument detailed by way of example in the accompanyings drawings wherein FIG. 1 is a front elevational view of the cyclometer with the plunger shown contacting a concave surface of a workpiece which supports the pair of chordally separated buttons, the lower right portions broken away.

FIG. 2 is a transverse sectional view taken along the line 2—2 of FIG. 1.

FIG. 3 is a bottom plan view of the instrument of FIG. 1.

FIG. 4 is a rear elevational view of the instrument of FIG. 1 with a larger span support frame having its contact buttons and the plunger shown in measuring position upon a convex workpiece, with portions along the stem broken away to show internal construction.

FIG. 5 is a bottom plan view of the support frame of FIG. 4.

DETAILED DESCRIPTION OF A PREFERRED CONSTRUCTION

There is an upstanding, generally cylindrical housing 10 (FIG. 4), externally carrying a rotatable ring 12 projecting outward a short distance beyond its forward edge, which ring is fixed to an annular index strip 14 (FIG. 1) which together with the ring are rotatably adjustable relative to an underlying fixed facing disk 16 carried by the housing. A lock finger 18 extends from the external housing surface to overlie the ring 12 and is locked in place by a headed screw 20 so that by turning the ring a desired amount, the zero reading of the index strip 14 can be set at any desired position. A successive pair of flat-faced snap rings, each with a radial index finger 21, 22 are held in place by a forward flange of the ring so as to rotatively overlie the index strip 14. They can thus be moved to positions of permissible limits to be measured by the gage on a particular workpiece or series of workpieces.

Around its inner periphery the housing 10 supports a radially inward extending casting 24 which is shaped to accommodate the several embraced operating elements lodged therein, with its rear face 25 tapped at 26 to receive the mounting screws of a cover plate (not shown). A pair of diametrically aligned, axially apertured posts 28, 30 extend oppositely outward from the top and bottom of the housing 10 and are jointly traversed by a cylindrical spindle or plunger 32 which is thus both rotatable and longitudinally movable, its upper end carrying a fixed sleeve 33 and operating knob 34.

Within the housing, the spindle has two threaded lengths 36, 37 separated by an unthreaded length which is rotatable within a collar 38 of a transverse arm 39 which terminally projects a guide pin 40 into a chordal guideway 41 of the casting 24, thus riding up and down with a longitudinal (axial) displacement of the spindle. A coil spring 42 connects the arm 39 to an anchorage stud 43 on the casting 24.

At the other side of the housing, a bifurcate plate 44 mounted on posts 45, 46 disposes a pinion 47, 48 in engagement with the respective threaded lengths 36, 37 of the spindle. The pinions engage respective spur gears 49, 50 which in turn engage opposite sides of a circle of gear teeth 51 of a pointer 52, the indicating end of which overlies the front index strip 14.

A detachable support frame 55 is formed with a transverse cross arm 56 medially apertured at 57 for free passage of the contact end 35 of the spindle, with an externally threaded chuck 58 upstanding from the cross arm and forming an upward extension of the channel 57. Each of the chuck jaws are moved centripetally inward by upward rotation of an attachment nut 60 so as to engage the lower housing post 30, thus forming a quick coupling for support frames 55 of different contact span or chordal length as well as to change between those adapted to measure convex and concave workpieces.

Adjacent each end of the elongated arm 56 is drilled a bore 61, 62 mutually parallel with the channel 57. Each of the bores detachably houses the cylindrical shaft 63 of a contact pin or button having an annularly enlarged head 64 with a perpendicular flat contact face or end 65. The shaft 63 is of less length than the corresponding bore 61, 62, and formed with a top-open, tapped socket which receives the threaded length 65 of a positioning screw having s slotted, peripherally enlarged head 67; the latter thus overlies the top surface of the cross arm 56 and when tightened thereagainst, anchors the contact head 64 at a selected rotational position by drawing the upper surface of the head 64 in firm registration with the undersurface 59 of the cross arm 56. It will be seen that the perimeters of the flat-ended heads 64 make point contact at their outer edges with a concave workpiece W (FIG. 1) and at their inner edges with a convex workpiece W1 (FIG. 4). With a steel head, the edge contact point may become visibly shiny as a result of usage which reduces it as little as 0.005 inch, and upon such visual change, the button may be rotationally shifted to a new contact position. Conveniently a series of such interchangeable support frames 56, 56a are used which vary by a span difference of 10 mm., e.g. having a chordal span of 20, 30, 40, 50, 60 mm. etc. A corresponding table of diopters is used for each gage width.

I claim:

1. A cylometer comprising in combination:
   a support carrying a projecting pair of contact members laterally spaced apart by the length of a chord which they are adapted to span upon contacting the curved surface of a workpiece, said contact members being mutually parallel, selectively rotatable cylinders, each characterized by an annular work-contact perimeter disposed perpendicular to its cylindrical axis and adapted for changeable point contact with the curved work surface,
   a longitudinally reciprocable plunger disposed parallel with said cylinders, transecting said support intermediate the contact members and having an end adapted to contact the workpiece in line with the midpoint of said chord, and
   indicator means responsive to movement of said plunge for indicating the perpendicular distance between said chord and the work-contacting end of the plunger, whereby the curvature of said workpiece can be determined.

2. A cylometer according to claim 1 wherein said support is detachably secured to the plunger and indicator means, whereby supports having contact members with spans of different chord lengths are interchangeable in the cylometer.

3. A cylometer according to claim 1 wherein said indicator means are adjustably mounted on said plunger, whereby they may be preset to the plane of a particular chord.

4. A cylometer according to claim 1 wherein said contact members are individually rotatable cylinders having annularly enlarged, flat work-contact ends.

5. A cylometer according to claim 2 in combination with a plurality of said detachable supports having spans of different chord length.

6. An attachment for detachable connection to a cylometer assembly having a longitudinally reciprocable plunger and graduated indicator means activatable by movement of said plunger,
   said attachment comprising a transverse arm medially apertured for free passage therethrough of the contact end of such plunger,
   coupling means surrounding said aperture for engagement with the cylometer assembly, and
   a pair of mutually parallel, selectively rotatable, cylindrical work-contact members spaced apart along said arm equidistant on opposite sides of said aperture so as by point contact with the annular perimeter thereof to span a chord of a curved workpiece of which the arcuate center may be contacted by said plunger upon passing through said aperture, parallel to said cylindrical work-contact members.

7. An attachment according to claim 6 wherein said work-contact members are cylinders having flat, annularly enlarged, work-contact faces, and means for anchoring same in said arm at selected rotational positions whereby edge contact points of their contact faces may be changed.

* * * * *